A. E. ROBERTS.
APPARATUS FOR RECOVERING HYDROCARBON PRODUCTS FROM GAS.
APPLICATION FILED FEB. 25, 1911.
1,150,454.
Patented Aug. 17, 1915.
4 SHEETS—SHEET 1.
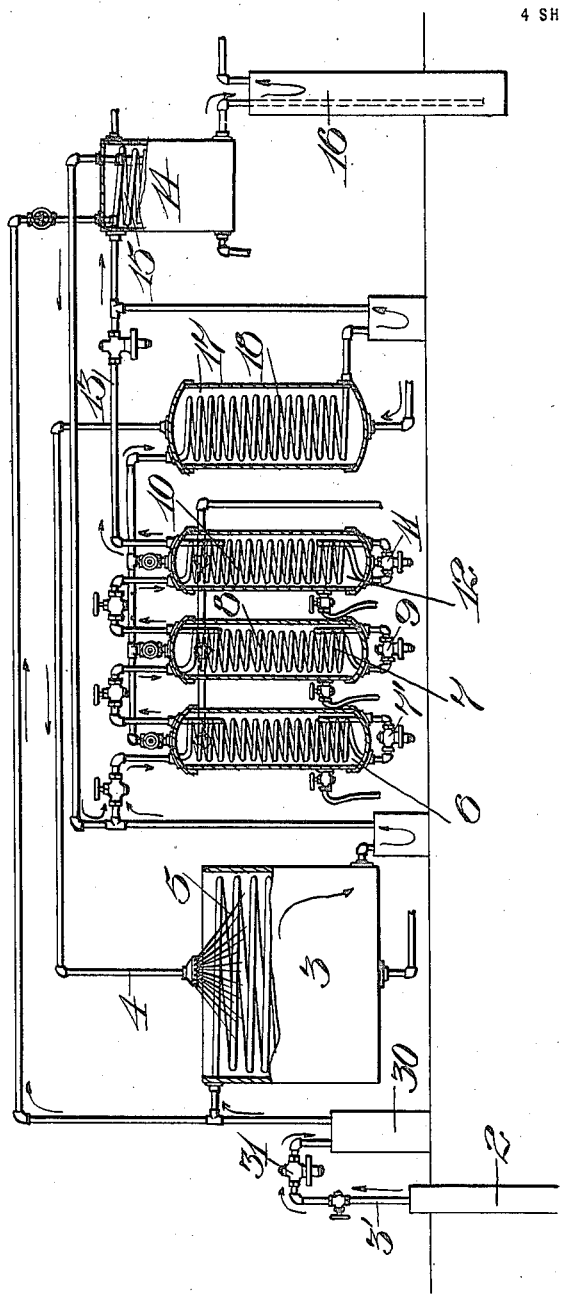

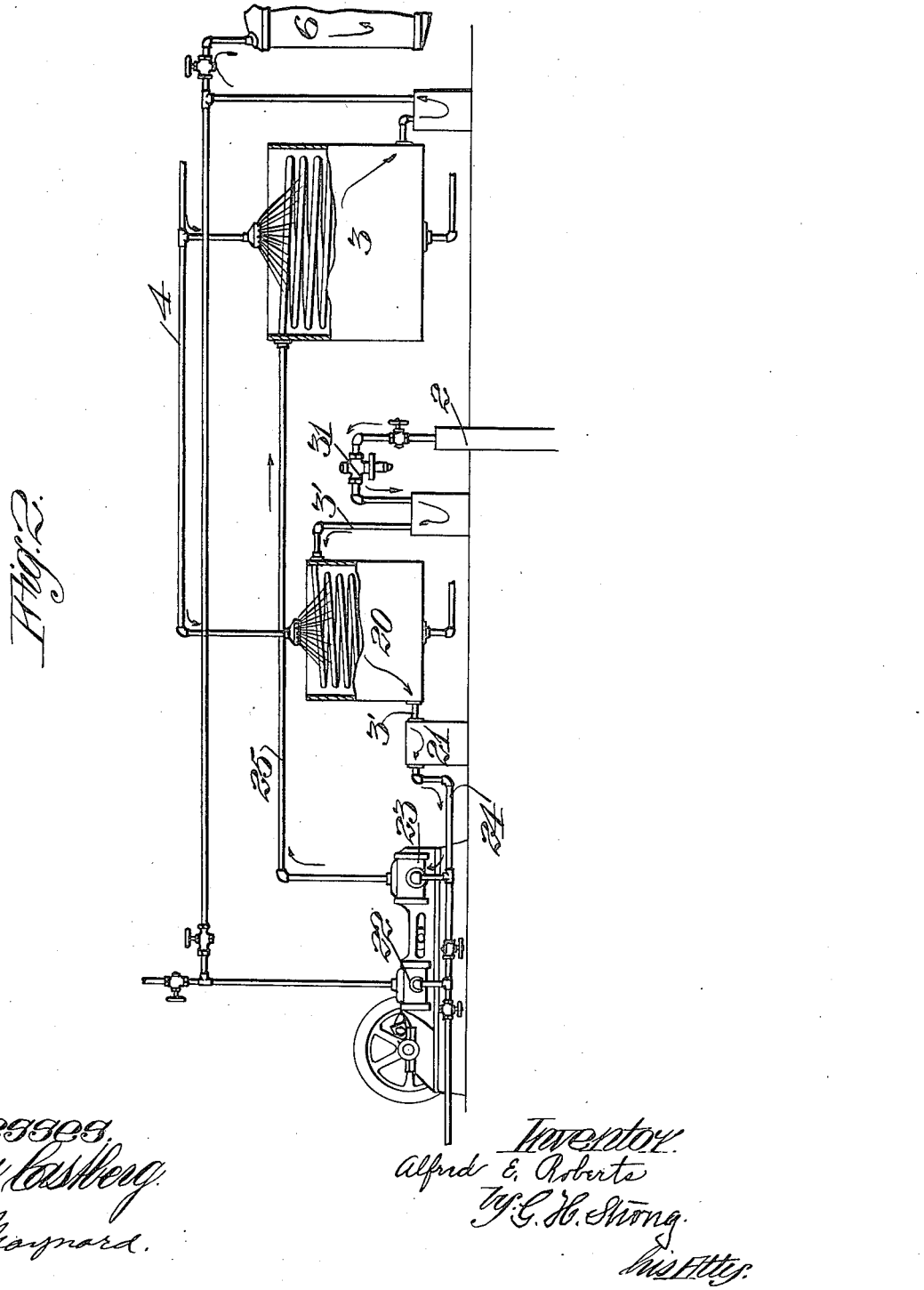

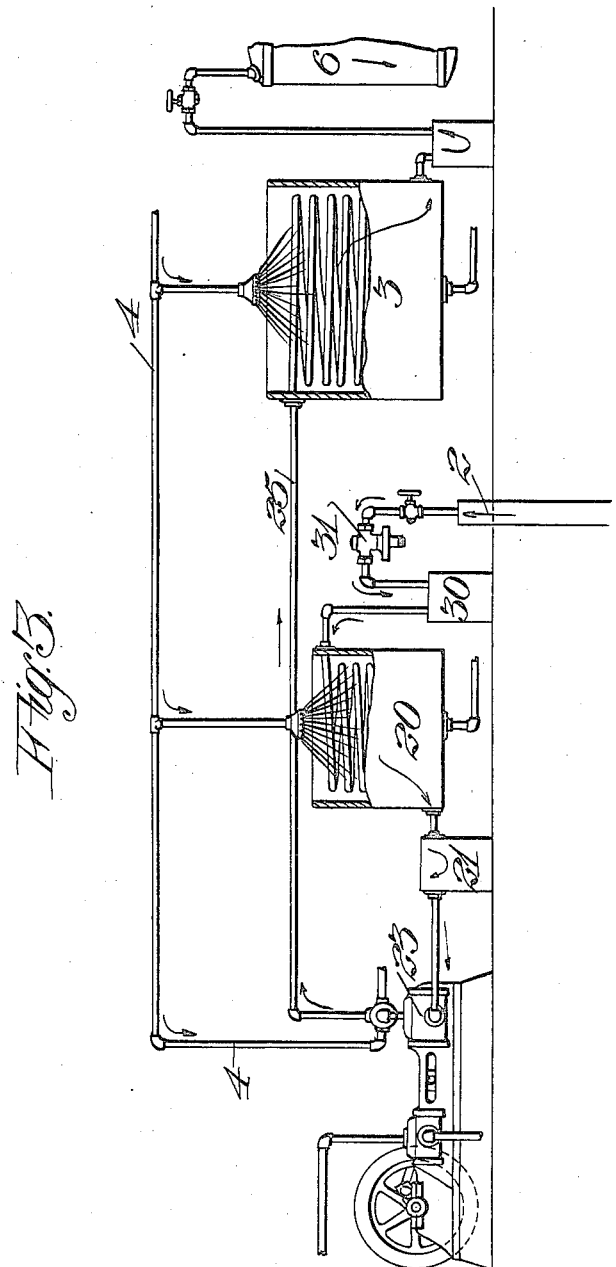

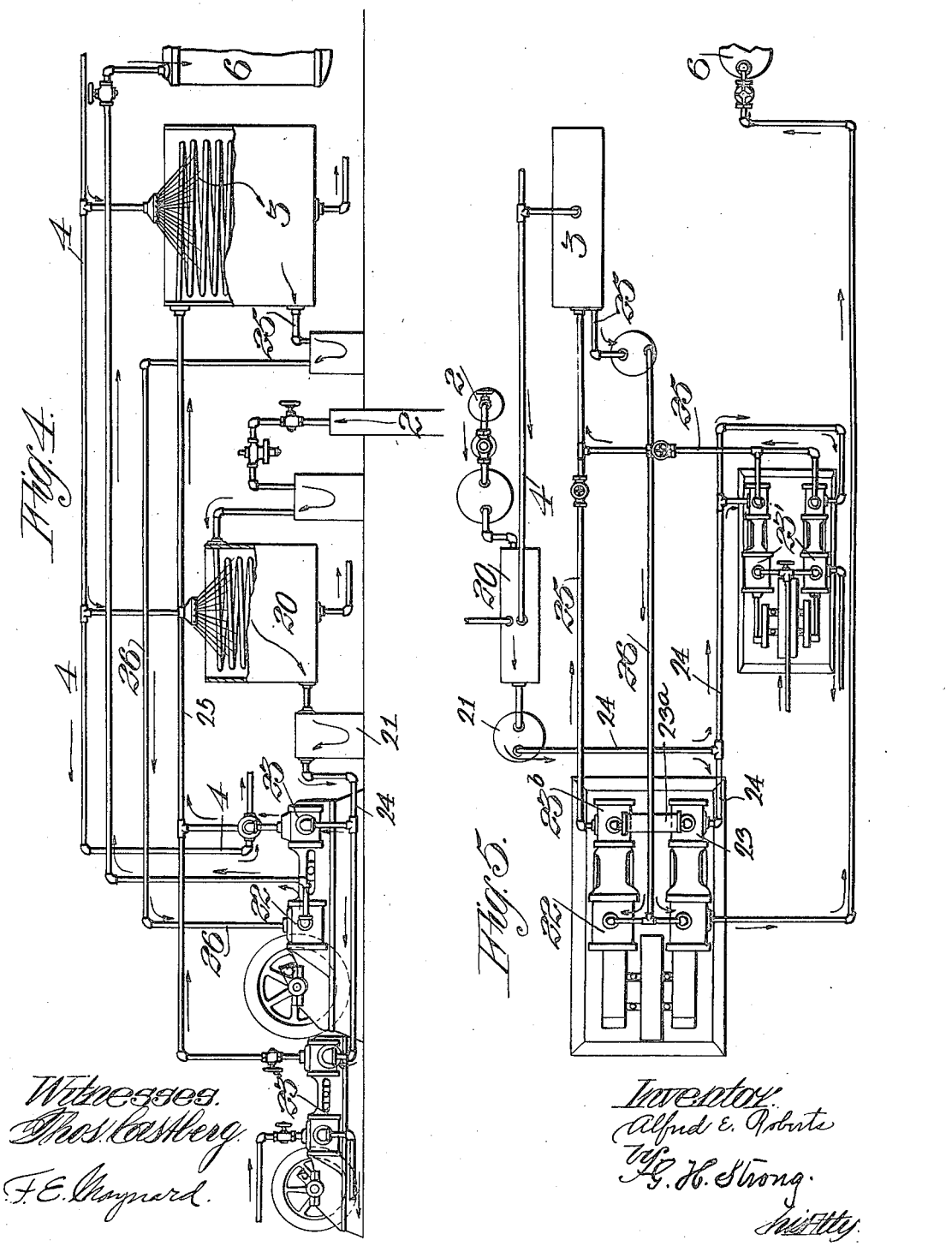

UNITED STATES PATENT OFFICE.

ALFRED E. ROBERTS, OF SAN FRANCISCO, CALIFORNIA.

APPARATUS FOR RECOVERING HYDROCARBON PRODUCTS FROM GAS.

1,150,454.   Specification of Letters Patent.   Patented Aug. 17, 1915.

Application filed February 25, 1911. Serial No. 610,847.

*To all whom it may concern:*

Be it known that I, ALFRED E. ROBERTS, citizen of the United States, residing in the city and county of San Francisco and State of California, have invented new and useful Improvements in Apparatus for Recovering Hydrocarbon Products from Gas, of which the following is a specification.

This invention relates to an apparatus wherein may be recovered certain gases, vapors and hydrocarbons by the compression, cooling and expansion of gas.

The object of the present invention is to provide a system or apparatus for the recovery of valuable light oils and other hydrocarbons carried by gas issuing from oil wells and other sources; to use the force of the pressure from the gas in wells to drive fluid compressors whereby the pressure of the gas may be increased; to provide an apparatus whereby compressed gas may be expanded to liquefy volatile substances carried by the gases; to provide means for heating "robbed" or exhausted gas and to transport the same to some point where it is utilized; to provide means whereby the compressed cooled gas may be utilized to cool the circulating cooling fluid; and also to provide an apparatus wherein the force of compressed cooled gas may be utilized to operate a compressor thus simultaneously effecting the expansion of the compressed gas and obtaining a further reduction in its temperature.

It is a desideratum to provide an apparatus capable of so treating gases escaping from oil and other wells as to liquefy and dehydrate the gas, depleting it of its several lighter oils and water, and to then render the "robbed" or exhausted gases into condition to be transported by pipe line, or other means, to a point of distribution and use; and it is also desirable to provide an apparatus in which the natural pressure existing in gases in certain wells may be utilized to operate compressing machinery whereby the pressure of gas issuing from a well can be increased to a desired pressure, thus utilizing the force or energy due to the natural pressure of the gas in the well; and also to design and provide an apparatus which is capable of receiving and so treating gases from oil wells, which are under high pressure, as to recover the several volatile oils and water in the gas.

The invention consits of the parts and the construction and combination of parts, as hereinafter more fully described and claimed, having reference to the accompanying drawings, in which—

Figure 1 is a diagrammatic view, representing a form of the apparatus as constructed to operate under natural pressure of gas in a well. Fig. 2 is a diagrammatic view of a form of the apparatus in which the system is shown as comprising a compressing device actuated by the natural pressure of gas in a well. Fig. 3 represents a form of the apparatus, such as employed when the gas in a well is without sufficient pressure to automatically operate the system, which is here shown as being provided with a motor driven gas compressor. Fig. 4 is a diagrammatic view, showing a form of the apparatus wherein power driven compressors are employed to raise the pressure of gas issuing from a well, and in which means are provided whereby a portion of the compressed gas is utilized as a motive force to operate a compressor. Fig. 5 is a plan view of Fig. 4.

In that form of my invention represented in Fig. 1, 2 represents a well from which issues gases and liquids, and it is the function of the apparatus to so condense the gases issuing from the well as to dehydrate them of water and also deplete them of the various oils, such as gasolene of different grades, and this is accomplished by conveying the gas through a conductor or pipe 3′ when the gas is under high pressure, say, for instance, five hundred pounds, directly to a suitable cooling device, here represented as a cooler 3.

A cooling fluid, such as water, or chlorid of calcium solution, is conveyed by means of the distribution pipe or other appropriate device 4 and discharged on the cooler, thus reducing the temperature of the gas flowing from the well into the cooler and causing the precipitation or condensation of certain of the volatile gases in the cooler, which condensed fluids are conveyed by a coiled pipe 5 into a preliminary receiver or trap 6.

Inasmuch as the pressure of the gas in the well may vary during its operation, I interpose between the cooler and the initial receiver or trap 6 a suitable reducing valve 7′ whereby a certain and fixed pressure of gas can be maintained in the receiver 6 irrespective of the varying pressure of the gas in the well.

The reducing valve 7' may be so adjusted as to permit gas from the cooler to flow into the receiver 6 at a pressure of about fifty-four pounds absolute, and which may be at 32° Fahrenheit, more or less. This reduction of pressure in the gas and also reduction of temperature of the gas with which it flows from the well causes a condensation and precipitation of a certain grade of light oil in the initial receiver 6.

From the receiver 6 the gas is delivered to a second receiver or trap 7 through a coiled pipe 8 in which is mounted a reducing valve 9 whereby the pressure of the gas flowing from the receiver 6 is reduced to a predetermined pressure in the second receiver 7. The gas in the receiver 7 may be maintained at approximately a pressure of forty pounds and have a temperature of zero, thus causing a further condensation and precipitation of fluids from the gas; the reduction of temperature being accomplished by the expansion of the gas from the first receiver 6 as it passes through the reducing valve 9 into the receiver 7.

From the receiver 7 the gas is conveyed through a coiled pipe 10 in which is mounted a reducing valve 11, from which it flows into a third receiver 12 at a temperature of −30°, for instance, and at a pressure of about thirty pounds absolute. This expansion of the gas after it has passed the cooler in a multiple series of receivers controlled by reducing valves, which permit of a constant given pressure in the several receivers, is effective to condense and precipitate various grades of fluids from the gas.

Having thus "robbed" or exhausted the gas coming from the well of its light oils and volatile gases and water, it is conveyed from the last of the receivers, as 12, through a connection, as pipe 13, to a heating device 14 in which are inclosed a series of coils 15 conveying the gas through the heating device 14 and discharging it finally into a suitable receptacle or well 16 in which it is accumulated at about a pressure of fifteen pounds though this is variable. A pipe 14' feeds hot gas to the heater 14 when, if desired, the residue gas may be heated for any purpose.

The fluid employed in the cooler 3 can be cooled before it passes to the cooler by directing it into a tank or vessel 17, through which may be led a coil 18 conducting a volume of the cooled gas after the latter has been conveyed through the cooler and one or more of the condensing receivers or traps 6, 7 or 12. Thus I am enabled to utilize the cooled gas for the reduction of the temperature of the cooling fluid as it passes on its way to the cooler and simultaneously accomplishing an increase in the temperature of the gas as it passes through the water cooling tank 17. It will be seen then that the gas under high pressure, in this instance issuing from the well 2 and conveyed to the cooler 3, is therein chilled sufficiently to reduce its pressure somewhat, and from thence conveyed into a series of precipitating receivers or traps in which the several grades of oils are segregated by reason of the varying temperatures and pressures in the receivers or traps; these pressures being gradually determined and controlled by the reducing valves disclosed. After the gas has been depleted of its volatile gases and vapors it is delivered to a receiver or well 16 from which it may be delivered to a transportation pipe line for utilization at a distant point or any other suitable disposition may be made of the refined gas in the receptacle 16.

In that form of my invention disclosed in Fig. 2, I have introduced into the apparatus a preliminary cooler 20 into which the gas issuing from the well is directly conveyed through pipe 3' and partially "robbed" of its temperature and volatile liquids; the resulting liquids being collected in a trap 21 from which the remaining gas is conveyed to a suitable form of motor 22 adapted to be operated by the pressure of the gas coming from the well when this is sufficient. In this instance the motor 22, deriving its force from the gas in the well, compresses the gas in a compressor 23, connected by a pipe 24 to the trap 21. The gas is compressed to a suitable pressure, say five hundred pounds, in the compressor 23 and thus delivered to the cooler 3 by means of the pipe 25.

After the gas has been delivered from the compressor 23, which is operated by the pressure of the gas from the well, to the cooler 3 it is subjected to the condensing treatment by the apparatus.

In Fig. 3 I have shown introduced into the system a compressor 23, which may be driven by any suitable form of motor, as, for instance, a steam engine, gas engine, etc. This form of apparatus is designed to be used when the pressure of the gas issuing from the well is not sufficiently high or regular to be depended upon to operate the compressor. In order to deplete the gas issuing from the well of some of its temperature and some of its volatile oils, it is conveyed into the cooler 20 and passes through the trap 21 before it is compressed in the compressor 23, thus relieving the latter of considerable work and keeping down the heat.

The compressor is connected to the cooler 3, described in Fig. 1, by pipe or connection 25; the gas issuing from the cooler 3 being subjected to the condensation described by the apparatus shown in Fig. 1.

For the purpose of rendering the apparatus efficient, it may sometimes be desirable to utilize the gas which is under pressure just after it leaves the cooler 3 to operate the compressor 23 in Fig. 4, in which event the latter compressor is driven by a motor, as 22, operated by the pressure of the gas which is conveyed to the motor 22 through a pipe 26 connected to the pipe 25, which conveys compressed gas from a compressor 23′ which may be driven by any suitable source of power, such as a steam or gas engine or other motor. The initial partial expansion occurring in the motor 22 results in a partial condensation of the volatile substances, the liquids being collected at the motor and the gas and uncondensed substances pass thence to the first expansion chamber, as 6, of the successive stage series. Preferably the expansion in motor 22 is prevented from producing temperatures less than 32° F. for the purpose of avoiding freezing of water content in the gas at the motor. Since the lighter vaporous substances will not condense at so high a temperature, they will pass to the condensers 6, 7 and 12, the reducing valve of each of which is designed to produce different pressures and temperatures so that the lighter vapors will be extracted separately and successively.

The several compressors herein spoken of may be of as many stages with inter-coolers using circulating fluid prepared in tank 17 as is desirable or necessary to raise the desired pressure of the gas as it is delivered to the cooler 3.

In that form of the apparatus shown in Fig. 4 a portion of the compressed gas is utilized as it is conveyed from the high pressure compressor 23′ through the pipe 25 to the cooler 3 and assist in operating motor 22 to compress gas in the compressor 23. An advantage of using a portion of the compressed gas after it leaves the cooler 3 by using it as a motive force in the motor 22 is that partial reduction in temperature and pressure occurs in the expansion of the gas in the motor 22 during its operation. The gas traveling from one of the expansion chambers to the next, as 6 and 7, is preferably conveyed through these traps or chambers before it is allowed to expand in them by means of coils of tubes or pipes, which start at the upper end of each of the receiving traps and are thus subjected to the cooling effect of the expanding gas in each of the traps, which cooling effect results in reducing the temperature of the gas flowing through the coils before it is exhausted into one of the traps, thereby utilizing the cooling effect of expanding gas to cool the gas during its traverse of the coils in each of the cooling or collecting traps. The advantage of this utilization of the cooling effect of the expanding gas is to reduce the initial work required of the compressors.

As hereinbefore stated, one of the important features of this system is in the utilization of the pressure of the gas in the cooler, which may be at say two hundred pounds, and the conduction of this cooled compressed gas to a motor in which the pressure of the gas is made effective to assist driving or to drive a compressor, and in so utilizing this gas, this temperature is further reduced as it is expanded; the exhaust of the expanded gas being conveyed to the subsequent expanding stages in one of the traps into which it may be expanded at a working pressure of about sixty-five pounds and in the remaining traps 6, 7 and 12.

The heater 14 may be heated by steam or, if desired, by a portion of gas drawn from a trap 30 into which gas may flow from the well 3, the pressure of which is regulated by a reducing valve 31 in pipe 3′. This reducing valve 31 is employed in all forms of the system to control the pressure from the well.

The compressor 23′ has a two-fold function. It is used for starting operation by generating a gas pressure in cooler 3 for use in starting and driving compressor 22, and serves as means of applying the prime motive force to make up losses due to the friction of the machine, plant losses, and the amount of work that is not restored back to the work of compression when the pressure in expansion traps is in excess of initial suction gas pressure.

In Figs. 4 and 5, the gas from the well passes to cooler 20, thence to trap 21, thence by pipe 24 to the first stage compressor, 23, driven by the expansion engine 22, from which it discharges into an intercooler 23ª. From the latter it goes to the second stage compressor, 23ᵇ, thence by pipe 25 to cooler 3. Pipe 24 branches to a compressor 23′ driven by a gas or other engine, and discharges into the common pipe 25.

Having thus described my invention, what I claim and desire to secure by Letters Patent, is—

1. An apparatus for the recovery of oils from a gas, which comprises a cooler to which the gas may be delivered at suitable pressure and wherein its temperature is lowered, a plurality of successively arranged expansion and condensing traps into which gas is admitted at different pressures and temperatures for precipitating various grades of oil, and means for adjusting the degree of pressure in the several traps.

2. An apparatus for the recovery of oils from a gas, which comprises a cooler to which the gas may be delivered at suitable pressure and wherein its temperature is lowered, a plurality of interconnected condensing traps into which may be successively precipitated at different temperatures various grades of oil from gas from the cooler, means for differing the degree of pressure in the several traps, and a receiver to which the depleted gas may be conveyed.

3. An apparatus for the recovery of hydrocarbons from gas, comprising means for increasing the pressure of the gas as it issues from a well, means for decreasing the temperature of the gas before it passes to the pressure creating means, a cooling device to which the compressed gas is delivered, and means for successively expanding the gas at different pressures in a plurality of stages for grading the oils, said means including reducing valves and traps connected thereto.

4. An apparatus for dehydrating and recovering oils from a gas issuing from a well, including a preliminary cooling device, a trap connected thereto for the reception of the condensing fluids, a compressor for increasing the pressure of the gas after it passes through the preliminary cooler, and means for reducing the temperature and pressure of the compressed gas by expanding it in a plurality of successive varying stages, said last-named means including separate receivers each provided with a coil and a reducing valve.

5. An apparatus for the recovery of hydrocarbons from gas, which comprises a cooling apparatus adapted to receive gas, separate receivers in which the gas is expanded in successive stages, and a device for cooling fluid to be used in said cooler, wherein the cooled gas is employed to decrease the temperature of the cooling fluid before it is used in the cooling apparatus.

6. An apparatus for the recovery of hydrocarbons from gas, which comprises a cooling apparatus adapted to receive gas, gas compressors for increasing the pressure of the gas after it passes through the cooler, means for expanding said gas in successive stages, said means including reducing valves and traps connected thereto, and a device for cooling fluid to be used in said cooling apparatus, and an intercooler located between the different compression stages in the gas compressors.

7. The combination in a system for dehydrating gases and segregating the precipitated oils in grades, of a source of gas supply, an initial cooler and its trap, means for compressing the gas from the cooler to a desired pressure, a second cooler and trap, a motor for utilizing the energy of the compressed gas expansively for obtaining an initial oil precipitate, said motor not expanding the gas to 32° F. or less to prevent freezing, and a multiplicity of expansion chambers with means for producing successively lower pressures in each for the liquefaction of different grades of oil in each as the temperature falls.

In testimony whereof I have hereunto set my hand in the presence of two subscribing witnesses.

ALFRED E. ROBERTS.

Witnesses:
  G. H. STRONG,
  M. E. RITCHIE.